United States Patent

Buchecker et al.

[11] Patent Number: 5,326,497
[45] Date of Patent: Jul. 5, 1994

[54] NITROGEN HETEROCYCLES AND LIQUID CRYSTALLINE MIXTURES CONTAINING THEM

[75] Inventors: Richard Buchecker, Zurich; Stephen Kelly, Möhlin; Martin Schadt, Seltisberg, all of Switzerland

[73] Assignee: Hoffmann-La Roche Inc., Nutley, N.J.

[21] Appl. No.: 955,633

[22] Filed: Oct. 2, 1992

[30] Foreign Application Priority Data

Oct. 16, 1991 [CH] Switzerland .................. 3034/91
Aug. 28, 1992 [CH] Switzerland .................. 2679/92

[51] Int. Cl.⁵ .............. C09K 19/30; C09K 19/12; C07D 239/02; C07D 213/62
[52] U.S. Cl. ................. 252/299.61; 252/299.64; 252/299.65; 252/299.66; 252/299.67; 544/298; 544/335; 546/326; 546/339
[58] Field of Search .......... 252/299.1, 299.61, 299.64, 252/299.65, 299.66, 299.67; 544/298, 355; 546/326, 339

[56] References Cited

U.S. PATENT DOCUMENTS 5,167,859 12/1992 Wächtler et al. ............. 252/299.61

FOREIGN PATENT DOCUMENTS 360622 3/1990 European Pat. Off. .
435632 7/1991 European Pat. Off. .
3939982 12/1989 Fed. Rep. of Germany .
1-301667 12/1989 Japan .
2-275864 11/1990 Japan .

*Primary Examiner*—Shean Wu
*Attorney, Agent, or Firm*—George M. Gould; George W. Johnston; Robert A. Silverman

[57] ABSTRACT

Compounds of the general formula

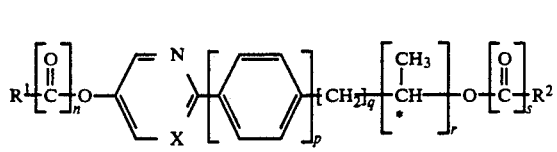

I wherein
$R^1$ is $C_{5-12}$-alkyl or $C_{5-12}$-alkenyl;
$R^2$ is $C_{1-9}$-alkyl or $C_{2-9}$-alkenyl; provided that at least one of groups $R^1$ and $R^2$ is alkenyl;
X is a CH group or nitrogen;
n is either 0 or 1;
q is a whole number between 2 to 6 inclusive;
r is either 0 or 1 provided that the sum of q and r at least 3,
s is either 0 or 1; and
p is either 1 or 2, provided that n is zero when p is 2;
mixtures which contain these compounds as well as the use of these compounds for electro-optical purposes.

5 Claims, No Drawings

NITROGEN HETEROCYCLES AND LIQUID CRYSTALLINE MIXTURES CONTAINING THEM

DESCRIPTION OF THE INVENTION

The present invention is concerned with nitrogen heterocycles, liquid crystalline mixtures which contain such compounds and their use for electro-optical purposes.

Liquid crystalline compounds are used primarily as dielectrics in indicating devices, since the optical properties of such substances can be influenced by an applied voltage. Electro-optical devices containing liquid crystals are well-known to persons skilled in the art and can be based on various effects. Examples of such devices are cells having dynamic scattering, DAP cells (deformation of aligned phases), SSF cells (surface stabilized ferroelectric), DHF cells (deformed helix ferroelectric) or SBF cells (short-pitch bistable ferroelectric).

Liquid crystalline materials must have a good chemical and thermal stability and must be stable when exposed to electric fields and electromagnetic radiation. Further, the liquid crystal materials should have low viscosity and in the cells should give short response times and a high contrast. Furthermore, at the usual operating temperatures of about −30° C. to about +80° C., especially in the range of about −20° C. to about +60° C., they should have a suitable mesophase, for example a broad smectic mesophase for the aforementioned cells.

Since liquid crystalline compounds are frequently used as mixtures of several components, it is, moreover, important that the components have a good miscibility with one another.

The present invention includes compounds of the formula

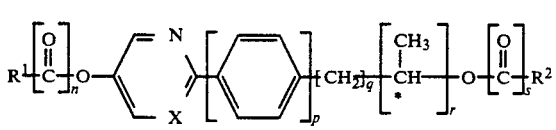

wherein
$R^1$ is $C_{5-12}$-alkyl or $C_{5-12}$-alkenyl;
$R^2$ is $C_{1-9}$-alkyl or $C_{2-9}$-alkenyl; provided that at least one of groups $R^1$ and $R^2$ is alkenyl;
X is a CH group or nitrogen;
r is either 0 or 1;
q is a whole number between 2 and 6 inclusive;
r is either 0 or 1 provided that the sum of q and r is at least 3,
s is either 0 or 1;
p is either 1 or 2, provided that n is zero when p is 2.

The term "alkyl" used in formula I and II refers to straight-chain residues with between 1 to 12 carbon atoms such as methyl, ethyl, propyl, butyl, pentyl, hexyl, heptyl, octyl, nonyl, decyl, undecyl and dodecyl.

The term "alkenyl" used in formulas I and II refers to straight-chain residues with between 2 to 12 carbon atoms. Such residues are, for example, allyl, 2E-butenyl, 2E-pentenyl, 2E-hexenyl, 2E-heptenyl, 2E-octenyl, 2E-nonenyl, 2E-decenyl, 2E-undecenyl, 2E-dodecenyl, 3-butenyl, 3Z-pentenyl, 3Z-hexenyl, 3Z-heptenyl, 3Z-octenyl, 3Z-nonenyl, 3Z-decenyl, 3Z-undecenyl, 3Z-dodecenyl, 4-pentenyl, 4E-hexenyl, 4E-heptenyl, 4E-octenyl, 4E-nonenyl, 4E-decenyl, 4E-undecenyl, 4E-dodecenyl, 5-hexenyl, 5Z-heptenyl, 5Z-octenyl, 5Z-nonenyl, 5Z-decenyl, 5Z-undecenyl, 5Z-dodecenyl, 6-heptenyl, 6E-octenyl, 6E-nonenyl, 6E-decenyl, 6E-undecenyl, 6E-dodecenyl, 7-octenyl, 7Z-nonenyl, 7Z-decenyl, 7Z-undecenyl, 7Z-dodecenyl, 8-nonenyl, 8E-decenyl, 8E-undecenyl, 8E-dodecenyl, 9-decenyl, 9Z-undecenyl, 9Z-dodecenyl, 10-undecenyl, 10E-dodecenyl, 11-dodecenyl and the like.

Compounds of formula I wherein r is 1 are excellent dopants for ferro-electric liquid crystalline mixtures, because some of these compounds possess a smectic C phase.

Compounds of the formula

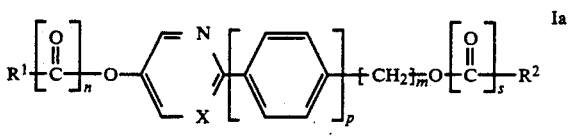

wherein
$R^1$, $R^2$, X, n, s and p are as described above and m is a whole number between 3 and 6 inclusive are preferred compounds.

Compounds of formula I and Ia in which $R^1$ denotes alkenyl with 5 to 10 carbon atoms, $R^2$ is alkyl with 1 to 7 carbon atoms and X is nitrogen are also preferred compounds.

Compounds of the formula

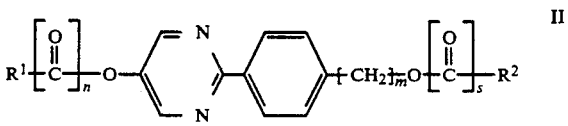

wherein
$R^1$ is $C_{8-10}$-alkenyl; $R^2$ is $C_{1-5}$-alkyl; and n, m and s are as described above are particularly preferred compounds.

It has surprisingly been found that the compounds in accordance with the invention have extraordinarily favorable mesophases for ferroelectric applications. The compounds in accordance with the invention have broad smectic C mesophases with remarkably low viscosity, which lead to very short switching times. The melting point of the compounds in accordance with the invention is often very low. This gives rise to a significant lowering of the melting point of mixtures which contain such compounds and thus leads to comparatively broad smectic mesophases.

The compounds of formula I in accordance with the invention in which n is 1 can be manufactured in a manner known per se from 5-hydroxypyrimidines and, respectively, 5-hydroxypyridines and an acid. The reaction can be effected, for example, in the presence of N,N'-dicyclohexylcarbodiimide and 4-(dimethylamino)pyridine in dichloromethane or any other suitable solvent such as chloroform.

The compounds of formula I in accordance with the invention in which n is 0 can also be manufactured in a manner known per se from the corresponding 5-hydroxypyrimidines and, respectively, 5-hydroxypyridines and 1-hydroxyalkenes. Thus, 5-hydroxy-2-(p-substituted)-phenyl-pyrimidine can be reacted, for example, with a hydroxyalkene under Mitsunobu conditions, i.e. in the presence of diethyl azodicarboxylate and triphenylphosphine in tetrahydrofuran.

The compounds of formula I can be used in the form of mixtures with one another and/or with other liquid crystalline components. The compounds of formula I are preferably used in mixtures with other liquid crystalline components.

The liquid crystalline mixtures in accordance with the invention contain at least two components having at least one component being a compound of formula I. A second component and optionally additional components can also be compounds of formula I or other liquid crystalline compounds. In each case, however, at least one chiral component must be present in the mixture. This chiral dopant can either be a chiral compound of formula I or a known chiral dopant.

Such liquid crystal components are preferably achiral compounds of the formula

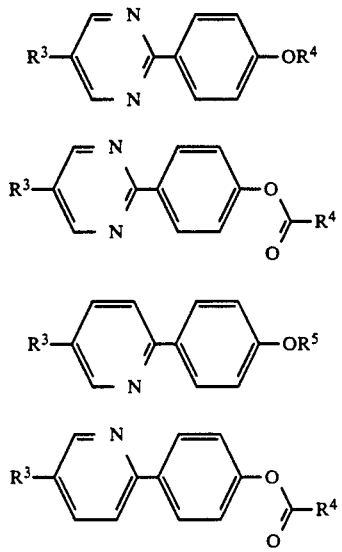

and, respectively, chiral dopants of the general formulae

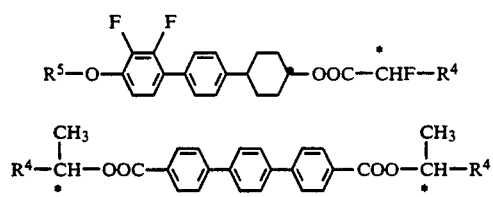

wherein $R^3$ is alkyl or alkoxy; $R^4$ is alkyl; and $R^5$ is alkyl or alkenyl.

The term "alkyl" in formulae III to VIII refers to straight-chain and branched alkyl groups with 1 to 15 carbon atoms, preferably straight-chain alkyl groups with 1–12 carbon atoms such as methyl, ethyl, propyl, butyl, pentyl, hexyl, heptyl, octyl, nonyl, decyl, undecyl, dodecyl and the like.

The term "alkoxy" in formulae III to VIII refers to ether groups in which the alkyl residue is as described above.

The term "alkenyl" in formulae III to VIII refers to alkenyl groups with 2 to 15 carbon atoms such as 2E-alkenyl, 3Z-alkenyl, 4E-alkenyl and alkenyl residues having a terminal double bond, preferably alkenyl groups with 2 to 9 carbon atoms.

The terms "2E-alkenyl", "3Z-alkenyl" and "4E-alkenyl" embrace straight-chain alkenyl groups with 3 to 15, 4 to 15 and, respectively, 5 to 15 carbon atoms in which the double bond is present in the 2, 3 and, respectively, 4 position, whereby E and Z denote the configuration of the double bond. Such groups are, for example, allyl, 2E-butenyl, 2E-pentenyl, 2E-hexenyl, 2E-heptenyl, 2E-octenyl, 2E-nonenyl, 2E-decenyl, 3-butenyl, 3Z-pentenyl, 3Z-hexenyl, 3Z-heptenyl, 3Z-octenyl, 3Z-nonenyl, 3Z-decenyl, 4-pentenyl, 4E-hexenyl, 4E-heptenyl, 4E-octenyl, 4E-nonenyl, 4E-decenyl and the like. The term "alkenyl" having a terminal double bond means straight-chain unbranched alkenyls with 2 to 15 carbon atoms such as, for example, allyl, 3-butenyl, 4-pentenyl, 5-hexenyl, 6-heptenyl, 7-octenyl, 8-nonenyl, 9-decenyl and the like.

Given the good solubility of the compounds of formula I and given their good miscibility with each other, the content of compounds of formula I in the mixtures in accordance with the invention can be relatively high and can amount to about 85 wt. %. However, a content of compounds of formula I of about 1–50 wt. %, especially of about 5–35 wt. %, is generally preferred.

The manufacture of the liquid crystalline mixtures and of the electro-optical devices can be effected in a manner known per se.

The invention is illustrated in more detail by the following Examples. In the Examples C is a crystalline phase, N is a nematic phase, S is a smectic phase and I is the isotropic phase.

EXAMPLE 1

0.8 g of N,N′-dicyclohexylcarbodiimide was added within 5 minutes while stirring to a solution of 1.0 g of 2-[4-(5[propyloxy]-1-pentyl)phenyl]-5-hydroxypyrimidine, 0.4 g of (Z)-3-octenoic acid and 0.05 g of 4-(dimethylamino)pyridine in 30 ml of dichloromethane. The reaction mixture was stirred overnight, then filtered and the filtrate was washed with saturated sodium bicarbonate solution and with water and concentrated. Chromatography of the residue on silica gel with hexane/ethyl acetate (vol. 4:1) and two-fold recrystallization of the thin-layer chromatographically pure fractions gave 1.0 g of 2-[4-(5-[propyloxy]-1-pentyl)phenyl]-5-{[(Z)-3-octenoyl]oxy}pyrimidine.

The 2-[4-(5-[propyloxy]-1-pentyl)phenyl]-5-hydroxypyrimidine used as the starting material was prepared as follows:

a) Hydrogen chloride was introduced for 6 hours into a solution of 30 g of 4-bromobenzonitrile, 23 ml of ethyl alcohol and 200 ml of toluene at 0° C. The reaction mixture was stirred at room temperature for a further 48 hours, then concentrated and dried in a vacuum. This gave 39 g of ethyl 4-bromobenzimidate hydrochloride with m.p. 250° C. (decomposition).

b) A mixture of 39 g of ethyl 4-bromobenzimidate hydrochloride and 100 ml of ethyl alcohol was treated at room temperature under nitrogen with 82.5 ml of saturated ethanolic ammonia solution and stirred overnight. The reaction mixture was concentrated, dried in a vacuum, suspended in diethyl ether, stirred at room temperature for 2 hours, cooled to 0° C. and suction filtered. The white crystals were washed with diethyl ether and then dried in a vacuum. This gave 35.7 g of 4- bromobenzamidine hydrochloride with m.p. 265° C.

c) A sodium methylate solution freshly prepared from 50 ml of methanol and 2.6 g of sodium was treated while gassing with nitrogen with 15 g of 4-bromobenzamidine hydrochloride and 13.5 g of 1,3-bis(dimethylamino)-2-ethoxytrimethinium perchlorate (Cell. Czech. Chem. Commun. 38, 1168, 1973) in 80 ml of methanol. The reaction mixture was heated under slight reflux for 5 hours, then poured into 100 ml of water, neutralized with concentrated hydrochloric acid and then extracted three times with 100 ml of diethyl ether each time. The combined organic phases were washed with 100 ml of concentrated sodium chloride solution, 100 ml of concentrated potassium carbonate solution and then again with 100 ml of concentrated sodium chloride solution, dried over magnesium sulfate, filtered and subsequently concentrated. The residue was chromatographed on silica gel with hexane/ethyl acetate (vol. 9:1) and then recrystallized from ethyl alcohol. This gave 14.7 g of pure 2-(4-bromophenyl)-5-(ethoxy)pyrimidine with 135° C.

d) A mixture of 14.7 g of 2-(4-bromophenyl)-5-(ethoxy)-pyrimidine, 5.7 g of 4-penten-1-ol, 10 g of sodium bicarbonate and 20 ml of N-methylpyrrolidone was treated with 0.3 g of triphenylphosphine and 0.12 g of palladium acetate. The reaction mixture was heated at 120° C. for 2 hours under a nitrogen atmosphere, then poured into 100 ml of water and extracted three times with 50 ml of diethyl ether each time. The combined organic phases were washed twice with 100 ml of concentrated sodium chloride solution each time, dried over magnesium sulfate, filtered and subsequently concentrated. Chromatography of the residue on silica gel with hexane/ethyl acetate (vol. 8:2) and recrystallization from ethyl alcohol gave 12 g of 2-[4-(5-hydroxy-1-pentenyl)phenyl]-5-(ethoxy)pyrimidine.

e) A mixture of 12 g of 2-[4-(5-hydroxy-1-pentenyl)-phenyl]-5-(ethoxy)pyrimidine, 2 g of palladium on active charcoal (10 w/w %) and 150 ml of ethyl acetate was hydrogenated at normal pressure and room temperature until one molar equivalent of hydrogen had been taken up. The inorganic material was filtered off and the filtrate was concentrated. The residue was purified by chromatography on silica gel with hexane/ethyl acetate (vol. 8:2). Recrystallization from ethyl alcohol gave 8.5 g of pure 2-[4-(5-hydroxy-1-pentyl)phenyl]-5-(ethoxy)pyrimidine.

f) A mixture of 1.2 g of sodium hydride (60–65 wt. %) and 150 ml of tetrahydrofuran was treated with 8.5 g of 2-[4-(5-hydroxy-1-pentyl)phenyl]-5-(ethoxy)-pyrimidine while gassing with nitrogen, stirred for 5 hours, treated with 4 g of propyl bromide and subsequently stirred at room temperature overnight. The reaction mixture was treated with 500 ml of water and extracted three times with 50 ml of diethyl ether each time. The combined organic phases were washed twice with 500 ml of concentrated sodium chloride solution each time, dried over magnesium sulfate, filtered and subsequently concentrated. Chromato- graphy of the residue on silica gel with hexane/ethyl acetate (vol. 9:1) and recrystallization from ethyl alcohol gave 7.5 g of pure 2-[4-(5-[propyloxy]-1-pentyl)phenyl]-5-(ethoxy)pyrimidine.

g) A mixture of 7.5 g of 2-[4-(5-[propyloxy]-1-pentyl)-phenyl]-5-(ethoxy)pyrimidine, 10 g of sodium hydroxide and 120 ml of diethylene glycol was heated at 180° C. for 8 hours. The reaction mixture was poured into 100 ml of water, acidified with concentrated hydrochloric acid, then extracted three times with 50 ml of diethyl ether each time. The combined organic phases were washed twice with 100 ml of concentrated sodium chloride solution, dried over magnesium sulfate, filtered and subsequently concentrated. Chromatography of the residue on silica gel with hexane/ethyl acetate (vol. 7:3) and recrystallization from ethyl alcohol gave 5.2 g of 2-[4-(5-[propyloxy]-1-pentyl)phenyl]-5-hydroxypyrimidine.

The following compounds can be manufactured in an analogous manner:

2-[4-(5-[Propyloxy]-1-pentyl)phenyl]-5-([E)-2-octenoyloxy)pyrimidine, m.p. (C-I) 68° C., (N-I) (64° C.), 2-[4-(5-[Propyloxy]-1-pentyl)phenyl]-5-([(E)-2-nonenoyl]oxy)pyrimidine, 2-[4-(5-[propyloxy]-1-pentyl)phenyl]-5-([(E)-2-decenoyl]oxy)pyrimidine, m.p. (C-N) 63° C., S$_C$-N (61° C.), cl.p. (N-I) 69° C., 2-[4-(5-[propyloxy]-1-pentyl)phenyl]-5-([(E)-2-doddecenoyl]oxy)pyrimidine, m.p. (C-S$_C$) 63° C., cl.p. (S$_C$-I) 73° C., 2-[4-(5-[propyloxy]-1-pentyl)phenyl]-5-([(Z)-3-nonenoyl]oxy)pyrimidine, 2-[4-(5-[propyloxy]-1-pentyl)phenyl]-5-([(Z)-3-decenoyl]oxy)pyrimidine, 2-[4-(5-[propyloxy]-1-pentyl)phenyl]-5-([(Z)-3-undecenoyl]oxy)pyrimidine, 2-[4-(5-[propyloxy]-1-pentyl)phenyl]-5-([(Z)-3-dodecenoyl]oxy)pyrimidine, 2-[4-(5-[propyloxy]-1-pentyl)phenyl]-5-([(E)-4-octenoyl]oxy)pyrimidine, m.p. (C-I) 68° C., 2-[4-(5-[propyloxy]-1-pentyl)phenyl]-5-([(E)-4-nonenoyl]oxy)pyrimidine, 2-[4-(5-[propyloxy]-1-pentyl)phenyl]-5-([(E)-4-decenoyl]oxy)pyrimidine, 2-[4-(5-[propyloxy]-1-pentyl)phenyl]-5-([(E)-4-undecenoyl]oxy)pyrimidine, 2-[4-(5-[propyloxy]-1-pentyl)phenyl]-5-([(E)-4-dodecenoyl]oxy)pyrimidine, 2-[4-(5-[propyloxy]-1-pentyl)phenyl]-5-([(Z)-5-octenoyl]oxy)pyrimidine, 2-[4-(5-[propyloxy]-1-pentyl)phenyl]-5-([(Z)-5-nonenoyl]oxy)pyrimidine, 2-[4-(5-[propyloxy]-1-pentyl)phenyl]-5-([(Z)-5-decenoyl]oxy)pyrimidine, 2-[4-(5-[propyloxy]-1-pentyl)phenyl]-5-([(Z)-5-undecenoyl]oxy)pyrimidine, 2-[4-(5-[propyloxy]-1-pentyl)phenyl]-5-([(Z)-5-dodecenoyl]oxy)pyrimidine, 2-[4-(5-[propyloxy]-1-pentyl)phenyl]-5-([(E)-6-octenoyl]oxy)pyrimidine, m.p. (C-I) 67° C., 2-[4-(5-[propyloxy]-1-pentyl)phenyl]-5-([(E)-6-nonenoyl]oxy)pyrimidine, 2-[4-(5-[propyloxy]-1-pentyl)phenyl]-5-([(E)-6-decenoyl]oxy)pyrimidine, 2-[4-(5-[propyloxy]-1-pentyl)phenyl]-5-([(E)-6-undecenoyl]oxy)pyrimidine, 2-[4-(5-[propyloxy]-1-pentyl)phenyl]-5-([(E)-6-dodecenoyl]oxy)pyrimidine, 2-[4-(5-[propyloxy]-1-pentyl)phenyl]-5-([7-octenoyl]oxy)pyrimidine, m.p. 54° C., 2-[4-(5-[propyloxy]-1-pentyl)phenyl]-5-([8-nonenoyl]oxy)pyrimidine, 2-[4-(5-[propyloxy]-1-pentyl)phenyl]-5-([9-decenoyl]oxy)pyrimidine, m.p. (C-$S_F$) 52° C., $S_F$-$S_C$ 57° C., d.p. ($S_C$-I) 61° C., 2-[4-(5-[propyloxy]-1-pentyl)phenyl]-5-([10-undecenoyl]oxy)pyrimidine, 2-[4-(5-[propyloxy]-1-pentyl)phenyl]-5-([11-dodecenoyl]oxy)pyrimidine, 2-[4-(5-[methoxy]-1-pentyl)-4'-biphenyl]-5-([(Z)-3-pentenyl)oxy]pyrimidine, 2-[4-(5-[methoxy]-1-pentyl)-4'-biphenyl]-5-([(Z)-3-hexenyl)oxy]pyrimidine, 2-[4-(5-[methoxy]-1-pentyl)-4'-biphenyl]-5-([(Z)-3-heptenyl)oxy]pyrimidine, 2-[4-(5-[methoxy]-1-pentyl)-4'-biphenyl]-5-([(Z)-3-octenyl)oxy]pyrimidine.

EXAMPLE 2

0.14 g of propanoic acid, 0.8 g of (−)-2-[4-(3-hydroxy-1-butyl)phenyl]-5-[(Z)-3-(octenyl)oxy]pyrimidine, 0.44 g of N,N'-dicyclohexylcarbodiimide, 0.04 g 4-(dimethylamino)pyridine and 25 ml dichloromethane were reacted in an analogous manner to Example 1 to give (−)-2-[4-(3-[(propanoyl)oxy]-1-butyl)phenyl]-5-[(Z)-3-(octenyl)oxy]pyrimidine.

The (−)-2-[4-(3-hydroxy-1-butyl)phenyl]-5-[(Z)-3-(octenyl)oxy]pyrimidine used as the starting material was prepared as follows:

a) 12 g of 2-(4-bromophenyl)-5-(ethoxy)pyrimidine, 12 g of 2-acetoxy-3-butene, 10 g of N-tert.butylamine, 20 ml of N-methylpyrrolidone, 0.12 g of palladium(II) acetate and 0.3 g of triphenylphosphine were reacted in analogous manner to Example 1(d) to give 9 g of 2-[4-(3-acetoxy-1-butenyl)phenyl]-5-ethoxypyrimidine.

b) 9 g of 2-[4-(3-acetoxy-1-butenyl)phenyl]-5-ethoxypyrimidine, 2 g of palladium on active charcoal (10 wt. %) and 150 ml of tetrahydrofuran were hydrogenated in an analogous manner to Example 1(e) to give 8.2 g of 2-(3-acetoxy-1-butyl)phenyl]-5-(ethoxy)pyrimidine.

c) A mixture of 250 ml of 0.3M phosphate buffer solution (pH 7.0), 25 ml of chloroform and 2.5 g of lipase (genus Arthobacter) was treated with 8.2 g of 2-(3-acetoxy-1-butyl)phenyl]-5-(ethoxy)pyrimidine. The reaction mixture was warmed at 36°–38° C. for 30 hours, then extracted three times with 50 ml of diethyl ether each time. The combined organic phases were washed twice with 50 ml of concentrated sodium chloride solution each time, dried over magnesium sulfate, filtered and subsequently concentrated. Chromatography of the residue on silica gel with hexane/ethyl acetate (vol. 7:3) and recrystallization from ethyl alcohol gave 2.9 g of (−)-2-[4-(3-hydroxy-1-butyl)phenyl]-5-(ethoxy)pyrimidine and 3.1 g of (−)-2-[4-(3-acetoxy-1-butyl)phenyl]-5-(ethoxy)pyrimidine.

d) 2.9 g of (−)-2-[4-(3-hydroxy-1-butyl)phenyl]-5-(ethoxy)pyrimidine, 3.1 g of (−)-2-[4-(3-acetoxy-1-butyl)phenyl]-5-(ethoxy)pyrimidine, 8 g of sodium hydroxide and 60 ml of diethylene glycol were reacted in an analogous manner to Example 1(c) to give 4.2 g of (−)-2-[4-(3-hydroxy-1-butyl)phenyl]-5-hydroxypyrimidine.

e) 0.33 g of (Z)-3-octenoic acid, 1.0 g of (−)-2-[4-(3-hydroxy-1-butyl)phenyl]-5-hydroxypyrimidine, 0.7 g of N,N'-dicyclohexylcarbodiimide, 0.04 g of 4-(dimethylamino)pyridine and 25 ml of dichloromethane were reacted in an analogous manner to Example 1 to give 0.8 g of (−)-2-[4-(3-hydroxy-1-butyl)phenyl]-5-[(Z)-3-(octenyl)oxy]pyrimidine.

The following compounds can be manufactured in an analogous manner:

(−)-2-[4-(3-[(Propanoyl)oxy]-1-butyl)phenyl]-5-([(E)-2-octenoyl]oxy)pyrimidin, (−)-2-[4-(3-[(propanoyl)oxy]-1-butyl)phenyl]-5-([(E)-2-nonenoyl]oxy)pyrimidine, (−)-2-[4-(3-[(propanoyl)oxy]-1-butyl)phenyl]-5-([(E)-2-decenoyl]oxy)pyrimidine, (−)-2-[4-(3-[(propanoyl)oxy]-1-butyl)phenyl]-5-([(E)-2-undecenoyl]oxy)pyrimidine, (−)-2-[4-(3-[(propanoyl)oxy]-1-butyl)phenyl]-5-([(E)-2-dodecenoyl]oxy)pyrimidine, (−)-2-[4-(3-[(Propanoyl)oxy]-1-butyl)phenyl]-5-([(Z)-3-nonenoyl]oxy)pyrimidine, (−)-2-[4-(3-[(propanoyl)oxy]-1-butyl)phenyl]-5-([(Z)-3-decenoyl]oxy)pyrimidine, (−)-2-[4-(3-[(propanoyl)oxy]-1-butyl)phenyl]-5-([(Z)-3-undecenoyl]oxy)pyrimidine, (−)-2-[4-(3-[(propanoyl)oxy]-1-butyl)phenyl]-5-([(Z)-3-dodecenoyl]oxy)pyrimidine, (−)-2-[4-(3-[(propanoyl)oxy]-1-butyl)phenyl]-5-([(E)-4-octenoyl]oxy)pyrimidine, (−)-2-[4-(3-[(propanoyl)oxy]-1-butyl)phenyl]-5-([(E)-4-nonenoyl]oxy)pyrimidine, (−)-2-[4-(3-[(propanoyl)oxy]-1-butyl)phenyl]-5-([(E)-4-decenoyl]oxy)pyrimidine, (−)-2-[4-(3-[(propanoyl)oxy]-1-butyl)phenyl]-5-([(E)-4-undecenoyl]oxy)pyrimidine, (−)-2-[4-(3-[(propanoyl)oxy]-1-butyl)phenyl]-5-([(E)-4-dodecenoyl]oxy)pyrimidine, (−)-2-[4-(3-[(propanoyl)oxy]-1-butyl)phenyl]-5-([(Z)-5-octenoyl]oxy)pyrimidine, (−)-2-[4-(3-[(propanoyl)oxy]-1-butyl)phenyl]-5-([(Z)-5-nonenoyl]oxy)pyrimidine, (−)-2-[4-(3-[(propanoyl)oxy]-1-butyl)phenyl]-5-([(Z)-5-decenoyl]oxy)pyrimidine, (−)-2-[4-(3-[(propanoyl)oxy]-1-butyl)phenyl]-5-([(Z)-5-undecenoyl]oxy)pyrimidine, (−)-2-[4-(3-[(propanoyl)oxy]-1-butyl)phenyl]-5-([(Z)-5-dodecenoyl]oxy)pyrimidine, (−)-2-[4-(3-[(propanoyl)oxy]-1-butyl)phenyl]-5-([(E)-6-octenoyl]oxy)pyrimidine, (−)-2-[4-(3-[(propanoyl)oxy]-1-butyl)phenyl]-5-([(E)-6-nonenoyl]oxy)pyrimidine, (−)-2-[4-(3-[(propanoyl)oxy]-1-butyl)phenyl]-5-([(E)-6-decenoyl]oxy)pyrimidine, (−)-2-[4-(3-[(propanoyl)oxy]-1-butyl)phenyl]-5-([(E)-6-undecenoyl]oxy)pyrimidine, (−)-2-[4-(3-[(propanoyl)oxy]-1-butyl)phenyl]-5-([(E)-6-dodecenoyl]oxy)pyrimidine, (−)-2-[4-(3-[(propanoyl)oxy]-1-butyl)phenyl]-5-([7-octenoyl]oxy)pyrimidine, (−)-2-[4-(3-[(propanoyl)oxy]-1-butyl)phenyl]-5-([8-nonenoyl]oxy)pyrimidine, (−)-2-[4-(3-[(propanoyl)oxy]-1-butyl)phenyl]-5-([9-decenoyl]oxy)pyrimidine, (−)-2-[4-(3-[(propanoyl)oxy]-1-butyl)phenyl]-5-([10-undecenoyl]oxy)pyrimidine, (−)-2-[4-(3-[(propanoyl)oxy]-1-butyl)phenyl]-5-([11-dodecenoyl]oxy)pyrimidine, (−)-2-[4-(5-[(propanoyl)oxy]-1-hexyl)phenyl]-5-([(E)-2-octenoyl]oxy)pyrimidin,
(−)-2-[4-(5-[(propanoyl)oxy]-1-hexyl)phenyl]-5-([(E)-2-nonenoyl]oxy)pyrimidin,
(−)-2-[4-(5-[(propanoyl)oxy]-1-hexyl)phenyl]-5-([(E)-2-decenoyl]oxy)pyrimidine,
(−)-2-[4-(5-[(propanoyl)oxy]-1-hexyl)phenyl]-5-([(E)-2-undecenoyl]oxy)pyrimidine,
(−)-2-[4-(5-[(propanoyl)oxy]-1-hexyl)phenyl]-5-([(E)-2-dodecenoyl]oxy)pyrimidine,
(−)-2-[4-(5-[(propanoyl)oxy]-1-hexyl)phenyl]-5-([(Z)-3-octenoyl]oxy)pyrimidine,
(−)-2-[4-(5-[(propanoyl)oxy]-1-hexyl)phenyl]-5-([(Z)-3-nonenoyl]oxy)pyrimidine,
(−)-2-[4-(5-[(propanoyl)oxy]-1-hexyl)phenyl]-5-([(Z)-3-decenoyl]oxy)pyrimidine,
(−)-2-[4-(5-[(propanoyl)oxy]-1-hexyl)phenyl]-5-([(Z)-3-undecenoyl]oxy)pyrimidine,
(−)-2-[4-(5-[(propanoyl)oxy]-1-hexyl)phenyl]-5-([(Z)-3-dodecenoyl]oxy)pyrimidine,
(−)-2-[4-(5-[(propenoyl)oxy]-1-hexyl)phenyl]-5-([7-octenoyl]oxy)pyrimidine,
(−)-2-[4-(5-[(propenoyl)oxy]-1-hexyl)phenyl]-5-([8-nonenoyl]oxy)pyrimidine,
(−)-2-[4-(5-[(propenoyl)oxy]-1-hexyl)phenyl]-5-([9-decenoyl]oxy)pyrimidine,
(−)-2-[4-(5-[(propenoyl)oxy]-1-hexyl)phenyl]-5-([10-undecenoyl]oxy)pyrimidine,
(−)-2-[4-(5-[(propenoyl)oxy]-1-hexyl)phenyl]-5-([11-dodecenoyl]oxy)pyrimidine,
(−)-2-[4-(3-acetoxy-1-butyl)phenyl]-5-([(E)-2-octenoyl]oxy)pyrimidine,
(−)-2-[4-(3-acetoxy-1-butyl)phenyl]-5-([(E)-2-nonenoyl]oxy)pyrimidine,
(−)-2-[4-(3-acetoxy-1-butyl)phenyl]-5-([(E)-2-decenoyl]oxy)pyrimidine,
(−)-2-[4-(3-acetoxy-1-butyl)phenyl]-5-([(E)-2-undecenoyl]oxy)pyrimidine,
(−)-2-[4-(3-acetoxy-1-butyl)phenyl]-5-([(E)-2-dodecenoyl]oxy)pyrimidine,
(−)-2-[4-(3-acetoxy-1-butyl)phenyl]-5-([(Z)-3-octenoyl]oxy)pyrimidine,
(−)-2-[4-(3-acetoxy-1-butyl)phenyl]-5-([(Z)-3-nonenoyl]oxy)pyrimidine,
(−)-2-[4-(3-acetoxy-1-butyl)phenyl]-5-([(Z)-3-decenoyl]oxy)pyrimidine,
(−)-2-[4-(3-acetoxy-1-butyl)phenyl]-5-([(Z)-3-undecenoyl]oxy)pyrimidine,
(−)-2-[4-(3-acetoxy-1-butyl)phenyl]-5-([(Z)-3-dodecenoyl]oxy)pyrimidine,
(−)-2-[4-(3-acetoxy-1-butyl)phenyl]-5-([7-octenoyl]oxy)pyrimidine,
(−)-2-[4-(3-acetoxy-1-butyl)phenyl]-5-([8-nonenoyl]oxy)pyrimidine,
(−)-2-[4-(3-acetoxy-1-butyl)phenyl]-5-([9-decenoyl]oxy)pyrimidine,
(−)-2-[4-(3-acetoxy-1-butyl)phenyl]-5-([10-undecenoyl]oxy)pyrimidine,
(−)-2-[4-(3-acetoxy-1-butyl)phenyl]-5-([11-dodecenoyl]oxy)pyrimidine,
(−)-2-[4-(5-acetoxy-1-hexyl)phenyl]-5-([(E)-2-octenoyl]oxy)pyrimidine,
(−)-2-[4-(5-acetoxy-1-hexyl)phenyl]-5-([(E)-2-nonenoyl]oxy)pyrimidine,
(−)-2-[4-(5-acetoxy-1-hexyl)phenyl]-5-([(E)-2-decenoyl]oxy)pyrimidine,
(−)-2-[4-(5-acetoxy-1-hexyl)phenyl]-5-([(E)-2-undecenoyl]oxy)pyrimidine,
(−)-2-[4-(5-acetoxy-1-hexyl)phenyl]-5-([(E)-2-dodecenoyl]oxy)pyrimidine,
(−)-2-[4-(5-acetoxy-1-hexyl)phenyl]-5-([(Z)-3-octenoyl]oxy)pyrimidine,
(−)-2-[4-(5-acetoxy-1-hexyl)phenyl]-5-([(Z)-3-nonenoyl]oxy)pyrimidine,
(−)-2-[4-(5-acetoxy-1-hexyl)phenyl]-5-([(Z)-3-decenoyl]oxy)pyrimidine,
(−)-2-[4-(5-acetoxy-1-hexyl)phenyl]-5-([(Z)-3-undecenoyl]oxy)pyrimidine;
(−)-2-[4-(5-acetoxy-1-hexyl)phenyl]-5-([(Z)-3-dodecenoyl]oxy)pyrimidine,
(−)-2-[4-(5-acetoxy-1-hexyl)phenyl]-5-([7-octenoyl]oxy)pyrimidine, Smp. (C-I) 54° C., S$_A$-I (44° C.),
(−)-2-[4-(5-acetoxy-1-hexyl)phenyl]-5-([8-nonenoyl]oxy)pyrimidine,
(−)-2-[4-(5-acetoxy-1-hexyl)phenyl]-5-([9-decenoyl]oxy)pyrimidine,
(−)-2-[4-(5-acetoxy-1-hexyl)phenyl]-5-([10-undecenoyl]oxy)pyrimidine,
(−)-2-[4-(5-acetoxy-1-hexyl)phenyl]-5-([11-dodecenoyl]oxy)pyrimidine,
(−)-2-[4-(3-acetoxy-1-butyl)-4'-biphenyl]-5-([(E)-2-pentenoyl]oxy)pyrimidine,
(−)-2-[4-(3-acetoxy-1-butyl)-4'-biphenyl]-5-([(E)-2-hexenoyl]oxy)pyrimidine,
(−)-2-[4-(3-acetoxy-1-butyl)-4'-biphenyl]-5-([(E)-2-heptenoyl]oxy)pyrimidine,
(−)-2-[4-(3-acetoxy-1-butyl)-4'-biphenyl]-5-([(E)-2-octenoyl]oxy)pyrimidine,
(−)-2-[4-(3-acetoxy-1-butyl)-4'-biphenyl]-5-([(Z)-3-pentenoyl]oxy)pyrimidine,
(−)-2-[4-(3-acetoxy-1-butyl)-4'-biphenyl]-5-([(Z)-3-hexenoyl]oxy)pyrimidine,
(−)-2-[4-(3-acetoxy-1-butyl)-4'-biphenyl]-5-([(Z)-3-heptenoyl]oxy)pyrimidine,
(−)-2-[4-(3-acetoxy-1-butyl)-4'-biphenyl]-5-([(Z)-3-octenoyl]oxy)pyrimidine,
(−)-2-[4-(5-acetoxy-1-hexyl)-4'-biphenyl]-5-([(E)-2-pentenoyl]oxy)pyrimidine,
(−)-2-[4-(5-acetoxy-1-hexyl)-4'-biphenyl]-5-([(E)-2-hexenoyl]oxy)pyrimidine,
(−)-2-[4-(5-acetoxy-1-hexyl)-4'-biphenyl]-5-([(E)-2-heptenoyl]oxy)pyrimidine,
(−)-2-[4-(5-acetoxy-1-hexyl)-4'-biphenyl]-5-([(E)-2-octenoyl]oxy)pyrimidine,
(−)-2-[4-(5-acetoxy-1-hexyl)-4'-biphenyl]-5-([(Z)-3-pentenoyl]oxy)pyrimidine,
(−)-2-[4-(5-acetoxy-1-hexyl)-4'-biphenyl]-5-([(Z)-3-hexenoyl]oxy)pyrimidine,
(−)-2-[4-(5-acetoxy-1-hexyl)-4'-biphenyl]-5-([(Z)-3-heptenoyl]oxy)pyrimidine,
(−)-2-[4-(5-acetoxy-1-hexyl)-4'-biphenyl]-5-([(Z)-3-octenoyl]oxy)pyrimidine.

EXAMPLE 3

A mixture of 0.5 g of 2-[4-(5-[propyloxy]-1-pentyl)phenyl]-5-hydroxypyrimidine, 0.3 g of (Z)-3-octen-1-ol, 0.4 g of diethyl azodicarboxylate, 0.6 g of triphenylphosphine and 25 ml of absolute tetrahydrofuran was stirred at room temperature overnight and then concentrated. The residue was suspended with 50 ml of hot hexane and filtered. The filtrate was concentrated. Chromatography of the residue on silica gel with toluene/hexane (vol. 1:1) and recrystallization from methanol gave pure 2-[4-(5-[propyloxy]-1-pentyl)phenyl]-5-([(Z)-3-octenyl]oxy)pyrimidine, m.p. (C-I) 38° C.

The following compounds can be manufactured in an analogous manner:

2-[4-(5-[Propyloxy]-1-pentyl)phenyl]-5-([(E)-2-octenyl]oxy)pyrimidine, m.p. (C-S$_C$) 36° C., S$_C$-S$_A$ 60° C., cl.p. (S$_A$-I) 65° C., 2-[4-(5-[propyloxy]-1-pentyl)phenyl]-5-([(E)-2-nonenyl]oxy)pyrimidine, 2-[4-(5-[propyloxy]-1-pentyl)phenyl]-5-([(E)-2-decenyl]oxy)pyrimidine, 2-[4-(5-[propyloxy]-1-pentyl)phenyl]-5-([(E)-2-undecenyl]oxy)pyrimidine, 2-[4-(5-[propyloxy]-1-pentyl)phenyl]-5-([(E)-2-dodecenyl]oxy)pyrimidine, 2-[4-(5-[Propyloxy]-1-pentyl)phenyl]-5-([(Z)-3-nonenyl]oxy)pyrimidine, 2-[4-(5-[propyloxy]-1-pentyl)phenyl]-5-([(Z)-3-decenyl]oxy)pyrimidine, 2-[4-(5-[propyloxy]-1-pentyl)phenyl]-5-([(Z)-3-undecenyl]oxy)pyrimidine, 2-[4-(5-[propyloxy]-1-pentyl)phenyl]-5-([(Z)-3-dodecenyl]oxy)pyrimidine, 2-[4-(5-[propyloxy]-1-pentyl)phenyl]-5-([(E)-4-octenyl]oxy)pyrimidine, 2-[4-(5-[propyloxy]-1-pentyl)phenyl]-5-([(E)-4-nonenyl]oxy)pyrimidine, 2-[4-(5-[propyloxy]-1-pentyl)phenyl]-5-([(E)-4-decenyl]oxy)pyrimidine, 2-[4-(5-[propyloxy]-1-pentyl)phenyl]-5-([(E)-4-undecenyl]oxy)pyrimidine, 2-[4-(5-[propyloxy]-1-pentyl)phenyl]-5-([(E)-4-dodecenyl]oxy)pyrimidine, 2-[4-(5-[propyloxy]-1-pentyl)phenyl]-5-([(Z)-5-octenyl]oxy)pyrimidine, 2-[4-(5-[propyloxy]-1-pentyl)phenyl]-5-([(Z)-5-nonenyl]oxy)pyrimidine, S$_C$-S$_A$ 33° C., d.p. (S$_A$-I) 37° C., 2-[4-(5-[propyloxy]-1-pentyl)phenyl]-5-([(Z)-5-decenyl]oxy)pyrimidine, 2-[4-(5-[propyloxy]-1-pentyl)phenyl]-5-([(Z)-5-undecenyl]oxy)pyrimidine, 2-[4-(5-[propyloxy]-1-pentyl)phenyl]-5-([(Z)-5-dodecenyl]oxy)pyrimidine, 2-[4-(5-[propyloxy]-1-pentyl)phenyl]-5-([(E)-6-octenyl]oxy)pyrimidine, 2-[4-(5-[propyloxy]-1-pentyl)phenyl]-5-([(E)-6-nonenyl]oxy)pyrimidine, 2-[4-(5-[propyloxy]-1-pentyl)phenyl]-5-([(E)-6-decenyl]oxy)pyrimidine, 2-[4-(5-[propyloxy]-1-pentyl)phenyl]-5-([(E)-6-undecenyl]oxy)pyrimidine, 2-[4-(5-[propyloxy]-1-pentyl)phenyl]-5-([(E)-6-dodecenyl]oxy)pyrimidine, 2-[4-(5-[propyloxy]-1-pentyl)phenyl]-5-([7-octenyl]oxy)pyrimidine, m.p. (C-S$_C$) 15° C., S$_C$-S$_A$ 35° C., d.p. (S$_A$-I) 58° C., 2-[4-(5-[propyloxy]-1-pentyl)phenyl]-5-([8-nonenyl]oxy)pyrimidine, 2-[4-(5-[propyloxy]-1-pentyl)phenyl]-5-([9-decenyl]oxy)pyrimidine, 2-[4-(5-[propyloxy]-1-pentyl)phenyl]-5-([10-undecenyl]oxy)pyrimidine, 2-[4-(5-[propyloxy]-1-pentyl)phenyl]-5-([11-dodecenyl]oxy)pyrimidine, m.p. (C-S) 19° C., S$_3$-S$_2$ 36° C., S$_2$-S$_C$ 59° C., Klp. (S$_C$-I) 70° C., 2-[4-(5-[butyloxy]-1-pentyl)phenyl]-5-([(E)-2-octenyl]oxy)pyrimidine, m.p. (C-S$_C$) 31° C., S$_C$-S$_A$ 56° C., Klp. (S$_A$-I) 61° C., 2-[4-(5-methoxy-1-pentyl)-4'-biphenyl]-5-([(E)-2-pentenyl]oxy)pyrimidine, 2-[4-(5-methoxy-1-pentyl)-4'-biphenyl]-5-([(E)-2-hexenyl]oxy)pyrimidine, 2-[4-(5-methoxy-1-pentyl)-4'-biphenyl]-5-([(E)-2-heptenyl]oxy)pyrimidine, 2-[4-(5-methoxy-1-pentyl)-4'-biphenyl]-5-([(E)-2-octenyl]oxy)pyrimidine, 2-[4-(5-methoxy-1-pentyl)-4'-biphenyl]-5-([(Z)-3-pentenyl]oxy)pyrimidine, 2-[4-(5-methoxy-1-pentyl)-4'-biphenyl]-5-([(Z)-3-hexenyl]oxy)pyrimidine, 2-[4-(5-methoxy-1-pentyl)-4'-biphenyl]-5-([(Z)-3-heptenyl]oxy)pyrimidine, 2-[4-(5-methoxy-1-pentyl)-4'-biphenyl]-5-([(Z)-3-octenyl]oxy)pyrimidine, 2-[4-(6-[propyloxy]-1-hexyl)phenyl]-5-([(E)-2-octenyl]oxy)pyrimidine, 2-[4-(6-[propyloxy]-1-hexyl)phenyl]-5-([(E)-2-nonenyl]oxy)pyrimidine, 2-[4-(6-[propyloxy]-1-hexyl)phenyl]-5-([(E)-2-decenyl]oxy)pyrimidine, 2-[4-(6-[propyloxy]-1-hexyl)phenyl]-5-([(E)-2-undecenyl]oxy)pyrimidine, 2-[4-(6-[propyloxy]-1-hexyl)phenyl]-5-([(E)-2-dodecenyl]oxy)pyrimidine, 2-[4-(6-[propyloxy]-1-hexyl)phenyl]-5-([(Z)-3-octenyl]oxy)pyrimidine, 2-[4-(6-[propyloxy]-1-hexyl)phenyl]-5-([(Z)-3-nonenyl]oxy)pyrimidine, 2-[4-(6-[propyloxy]-1-hexyl)phenyl]-5-([(Z)-3-decenyl]oxy)pyrimidine, 2-[4-(6-[propyloxy]-1-hexyl)phenyl]-5-([(Z)-3-undecenyl]oxy)pyrimidine, 2-[4-(6-[propyloxy]-1-hexyl)phenyl]-5-([(Z)-3-dodecenyl]oxy)pyrimidine.

EXAMPLE 4

0.5 g of (Z)-3-octenoic acid, 1.0 g of 2-[4-(5-[propyloxy]-1-pentyl)phenyl]-5-hydroxypyridine, 07 g of N,N'-dicyclohexyl-carbodiimide, 0.04 g of (dimethylaminio)pyridine and 50 ml of dichloromethane were reacted in an analogous manner to Example 1 to give 2-[4-(5-[propyloxy]-1-pentyl)phenyl]-5-([(Z)-3-octenoyl]oxy)pyridine.

The 2-[4-(5-[propyloxy]-1-pentyl)phenyl]-5-hydroxypyridine used as the starting material was prepared as follows:

a) A Grignard reagent solution prepared from 0.8 g of magnesium, 8.0 g of 1,4-dibromobenzene and 50 ml of tetrahydrofuran was added dropwise at 0°-5° C. within 30 minutes to a mixture of 6.6 g of 5-trimethylsilyloxy-2-chloropyridine, 75 ml of tetrahydrofuran and 0.4 g of 1,3-bis(diphenylphosphino)-propanenickel(II) chloride. The reaction mixture was stirred for 3 hours, left to stand overnight, then adjusted to pH 8 with aqueous sodium hydrogen carbonate solution and diluted with diethyl ether. The organic phase was washed neutral with water, dried over sodium sulfate and concentrated. Chromatographic purification of the residue on silica gel with hexane/ethyl acetate (vol. 4:1) yielded 5.5 g of 5-hydroxy-2-(4-bromophenyl)-pyridine.

b) A mixture of 5.5 g of 5-hydroxy-2-(4-bromophenyl)-pyridine, 2.4 g of triethylamine and 50 ml of toluene was treated dropwise at 0° C. under nitrogen with 3.1 g of trimethylchlorosilane. The reaction mixture was stirred at room temperature overnight, then treated with 50 ml of saturated sodium bicarbonate solution and extracted three times with 100 ml of diethyl ether each time. The combined organic phases were washed twice with saturated sodium bicarbonate solution, dried over magnesium sulfate, filtered and subsequently concentrated. This gave 6.0 g of 5-trimethylsilyloxy-2-(4-bromophenyl)-pyridine.

c) 6.0 g of 5-trimethylsilyloxy-2-(4-bromophenyl)-pyridine, 2.5 g of 4-penten-1-ol, 4 g of sodium bicarbonate solution, 20 ml of N-methylpyrrolidone, 0.03 g of palladium(II) acetate and 0.11 g of triphenylphosphine were reacted in an analogous manner to Example 1(b) to give 5.4 g of 5-trimethylsilyloxy-2-(4-[5-hydroxy-1-pentenyl]phenyl)-pyridine.

d) 5.4 g of 5-trimethylsilyloxy-2-(4-[5-hydroxy-1-pentenyl]phenyl)pyridine, 1 g of palladium on active charcoal (10 w/w %) and 50 ml of ethyl acetate were reacted in an analogous manner to Example 1(c) to give 5.1 g of 5-trimethylsilyloxy-2-(4-[5-hydroxy-1-pentyl]phenyl)pyridine.

e) 5.1 g of 5-trimethylsilyloxy-2-(4-[5-hydroxy-1-pentyl]phenyl)pyridine, 0.7 g of sodium hydride (60–65 wt. %), 2.5 g of 1-bromopropane and 100 ml of tetrahydrofuran were reacted analogously to Example 1(f) to give 3.6 g of 5-hydroxy-2-(4-[5-(propyloxy)-1-pentyl]phenyl)pyridine.

The following compounds can be manufactured in an analogous manner:

2-[4-(5-[Propyloxy]-1-pentyl)phenyl]-5-([(E)-2-octenoyl]oxy)pyridine,
2-[4-(5-[propyloxy]-1-pentyl)phenyl]-5-([(E)-2-nonenoyl]oxy)pyridine,
2-[4-(5-[propyloxy]-1-pentyl)phenyl]-5-([(E)-2-decenoyl]oxy)pyridine,
2-[4-(5-[propyloxy]-1-pentyl)phenyl]-5-([(E)-2-undecenoyl]oxy)pyridine,
2-[4-(5-[propyloxy]-1-pentyl)phenyl]-5-([(E)-2-dodecenoyl]oxy)pyridine,
2-[4-(5-[propyloxy]-1-pentyl)phenyl]-5-([(Z)-3-nonenoyl]oxy)pyridine,
2-[4-(5-[propyloxy]-1-pentyl)phenyl]-5-([(Z)-3-decenoyl]oxy)pyridine,
2-[4-(5-[propyloxy]-1-pentyl)phenyl]-5-([(Z)-3-undecenoyl]oxy)pyridine,
2-[4-(5-[propyloxy]-1-pentyl)phenyl]-5-([(Z)-3-dodecenoyl]oxy)pyridine,
2-[4-(5-[propyloxy]-1-pentyl)phenyl]-5-([(E)-4-octenoyl]oxy)pyridine,
2-[4-(5-[propyloxy]-1-pentyl)phenyl]-5-([(E)-4-nonenoyl]oxy)pyridine,
2-[4-(5-[propyloxy]-1-pentyl)phenyl]-5-([(E)-4-decenoyl]oxy)pyridine,
2-[4-(5-[propyloxy]-1-pentyl)phenyl]-5-([(E)-4-undecenoyl]oxy)pyridine,
2-[4-(5-[propyloxy]-1-pentyl)phenyl]-5-([(E)-4-dodecenoyl]oxy)pyridine,
2-[4-(5-[propyloxy]-1-pentyl)phenyl]-5-([(Z)-5-octenoyl]oxy)pyridine,
2-[4-(5-[propyloxy]-1-pentyl)phenyl]-5-([(Z)-5-nonenoyl]oxy)pyridine,
2-[4-(5-[propyloxy]-1-pentyl)phenyl]-5-([(Z)-5-decenoyl]oxy)pyridine,
2-[4-(5-[propyloxy]-1-pentyl)phenyl]-5-([(Z)-5-undecenoyl]oxy)pyridine,
2-[4-(5-[propyloxy]-1-pentyl)phenyl]-5-([(Z)-5-dodecenoyl]oxy)pyridine,
2-[4-(5-[propyloxy]-1-pentyl)phenyl]-5-([(E)-6-octenoyl]oxy)pyridine,
2-[4-(5-[propyloxy]-1-pentyl)phenyl]-5-([(E)-6-nonenoyl]oxy)pyridine,
2-[4-(5-[propyloxy]-1-pentyl)phenyl]-5-([(E)-6-decenoyl]oxy)pyridine,
2-[4-(5-[propyloxy]-1-pentyl)phenyl]-5-([(E)-6-undecenoyl]oxy)pyridine,
2-[4-(5-[propyloxy]-1-pentyl)phenyl]-5-([(E)-6-dodecenoyl]oxy)pyridine,
2-[4-(5-[propyloxy]-1-pentyl)phenyl]-5-([7-octenoyl]oxy)pyridine, m.p. (C-I) 54° C.,
2-[4-(5-[propyloxy]-1-pentyl)phenyl]-5-([8-nonenoyl]oxy)pyridine,
2-[4-(5-[propyloxy]-1-pentyl)phenyl]-5-([9-decenoyl]oxy)pyridine,
2-[4-(5-[propyloxy]-1-pentyl)phenyl]-5-([10-undecenoyl]oxy)pyridine
2-[4-(5-[propyloxy]-1-pentyl)phenyl]-5-([11-dodecenoyl]oxy)pyridine,
2-[4-(5-[methoxy]-1-pentyl)-4'-biphenyl]-5-([(Z)-3-pentenoyl]oxy)pyridine,
2-[4-(5-[methoxy]-1-pentyl)-4'-biphenyl]-5-([(Z)-3-hexenoyl]oxy)pyridine,
2-[4-(5-[methoxy]-1-pentyl)-4'-biphenyl]-5-([(Z)-3-heptenoyl]oxy)pyridine,
2-[4-(5-[methoxy]-1-pentyl)-4'-biphenyl]-5-([(Z)-3-octenoyl]oxy)pyridine.

EXAMPLE 5

0.14 g of propanoic acid, 0.8 g of (−)-2-[4-(3-hydroxy-1-butyl)phenyl]-5-[(Z)-3-(octenyl)oxy]pyridine, 0.44 g of N,N'-dicyclohexylcarbodiimide, 0.04 g of 4-(dimethylamino)pyridine and 50 ml of dichloromethane are reacted in an analogous manner to Example 1 to give 0.7 g of (−)-2-[4-(3-[(propanoyl)-oxy]-1-butyl)phenyl]-5-[(Z)-3-(octenoyl)oxy]pyridine.

The (−)-2-[4-(3-hydroxy-1-butyl)phenyl]-5-[(Z)-3-(octenyl)oxy]pyridine used as the starting material can be prepared as follows:

a) 17 g of 5-trimethylsilyloxy-2-(4-bromophenyl)pyridine, 12 g of 2-acetoxy-3-butene, 10 g of N-tert.-butylamine, 20 ml of N-methylpyrrolidone, 0.12 g of palladium(II) acetate and 0.3 g of triphenylphosphine are reacted in an analogous manner to Example 1(d) to give 14 g of 2-[4-(3-acetoxy-1-butenyl)phenyl]-5-trimethylsilyloxy-pyridine.

b) 14 g of 2-[4-(3-acetoxy-1-butenyl)phenyl]-5-trimethylsilyloxy-pyridine, 2 g of palladium on active charcaol (10 wt. %) and 200 ml of tetrahydrofuran are hydrogenated in an analogous manner to Example 1(a) to give 12 g of 2-[4-(3-acetoxy-1-butyl)phenyl]-5-trimethylsilyloxy-pyridine.

c) 12 g of 2-[4-(3-acetoxy-1-butyl)phenyl]-5-trimethylsilyloxy-pyridine, 300 ml of 0.3M phosphate buffer solution (pH 7.0), 30 ml of chloroform and 3.0 g of lipase (genus Arthobacter) are reacted to give 4.5 g of (−)-2-[4-(3-hydroxy-1-butyl)-phenyl]-5-hydroxy-pyridine and 4.2 g of (−)-2-[4-(3-acetoxy-1-butyl)phenyl]-2-hydroxy-pyridine.

d) 0.35 g of (Z)-3-octenic acid, 1.0 g of (−)-2-[4-(3-hydroxy-1-butyl)phenyl]-5-hydroxy-pyridine, 0.7 g of N,N'-dicyclohexylcarbodiimide, 0.04 g of 4-(dimethylamino)pyridine and 25 ml of dichloromethane are reacted in an analogous manner to Example 1 to give 0.75 g of (−)-2-[4-(3-hydroxy-1-butyl)phenyl]-5-[(Z)-3-(octenyl)oxy]pyridine.

The following compounds can be manufactured in an analogous manner:

(—)-2-[4-(3-[(Propanoyloxy]-1-butyl)phenyl]-5-([(E)-2-octenoyl]oxypyridine,
(—)-2-[4-(3-[(propanoyl)oxy]-1-butyl)phenyl]-5-([(E)-2-nonenoyl]oxy)pyridine,
(—)-2-[4-(3-[(propanoyl)oxy]-1-butyl)phenyl]-5-([(E)-2-decenoyl]oxy)pyridine,
(—)-2-[4-(3-[(propanoyl)oxy]-1-butyl)phenyl]-5-([(E)-2-undecenoyl]oxy)pyridine,
(—)-2-[4-(3-[(propanoyl)oxy]-1-butyl)phenyl]-5-([(E)-2-dodecenoyl]oxy)pyridine,
(—)-2-[4-(3-[(propanoyl)oxy]-1-butyl)phenyl]-5-([(Z)-3-nonenoyl]oxy)pyridine,
(—)-2-[4-(3-[(propanoyl)oxy]-1-butyl)phenyl]-5-([(Z)-3-decenoyl]oxy)pyridine,
(—)-2-[4-(3-[(propanoyl)oxy]-1-butyl)phenyl]-5-([(Z)-3-undecenoyl]oxy)pyridine,
(—)-2-[4-(3-[(propanoyl)oxy]-1-butyl)phenyl]-5-([(Z)-3-dodecenoyl]oxy)pyridine,
(—)-2-[4-(3-[(propanoyl)oxy]-1-butyl)phenyl]-5-([(E)-4-octenoyl]oxy)pyridine,
(—)-2-[4-(3-[(propanoyl)oxy]-1-butyl)phenyl]-5-([(E)-4-nonenoyl]oxy)pyridine,
(—)-2-[4-(3-[(propanoyl)oxy]-1-butyl)phenyl]-5-([(E)-4-decenoyl]oxy)pyridine,
(—)-2-[4-(3-[(propanoyl)oxy]-1-butyl)phenyl]-5-([(E)-4-undecenoyl]oxy)pyridine,
(—)-2-[4-(3-[(propanoyl)oxy]-1-butyl)phenyl]-5-([(E)-4-dodecenoyl]oxy)pyridine,
(—)-2-[4-(3-[(propanoyl)oxy]-1-butyl)phenyl]-5-([(Z)-5-octenoyl]oxy)pyridine,
(—)-2-[4-(3-[(propanoyl)oxy]-1-butyl)phenyl]-5-([(Z)-5-nonenoyl]oxy)pyridine,
(—)-2-[4-(3-[(propanoyl)oxy]-1-butyl)phenyl]-5-([(Z)-5-decenoyl]oxy)pyridine,
(—)-2-[4-(3-[(propanoyl)oxy]-1-butyl)phenyl]-5-([(Z)-5-undecenoyl]oxy)pyridine,
(—)-2-[4-(3-[(propanoyl)oxy]-1-butyl)phenyl]-5-([(Z)-5-dodecenoyl]oxy)pyridine,
(—)-2-[4-(3-[(propanoyl)oxy]-1-butyl)phenyl]-5-([(E)-6-octenoyl]oxy)pyridine,
(—)-2-[4-(3-[(propanoyl)oxy]-1-butyl)phenyl]-5-([(E)-6-nonenoyl]oxy)pyridine,
(—)-2-[4-(3-[(propanoyl)oxy]-1-butyl)phenyl]-5-([(E)-6-decenoyl]oxy)pyridine,
(—)-2-[4-(3-[(propanoyl)oxy]-1-butyl)phenyl]-5-([(E)-6-undecenoyl]oxy)pyridine,
(—)-2-[4-(3-[(propanoyl)oxy]-1-butyl)phenyl]-5-([(E)-6-dodecenoyl]oxy)pyridine,
(—)-2-[4-(3-[(propanoyl)oxy]-1-butyl)phenyl]-5-([7-octenoyl]oxy)pyridine,
(—)-2-[4-(3-[(propanoyl)oxy]-1-butyl)phenyl]-5-([8-nonenoyl]oxy)pyridine,
(—)-2-[4-(3-[(propanoyl)oxy]-1-butyl)phenyl]-5-([9-decenoyl]oxy)pyridine,
(—)-2-[4-(3-[(propanoyl)oxy]-1-butyl)phenyl]-5-([10-undecenoyl]oxy)pyridine,
(—)-2-[4-(3-[(propanoyl)oxy]-1-butyl)phenyl]-5-([11-dodecenoyl]oxy)pyridine,
(—)-2-[4-(3-acetoxy-1-butyl)-4'-biphenyl]-5-([(Z)-3-pentenoyl]oxy)pyridine,
(—)-2-[4-(3-acetoxy-1-butyl)-4'-biphenyl]-5-([(Z)-3-hexenoyl]oxy)pyridine,
(—)-2-[4-(3-acetoxy-1-butyl)-4'-biphenyl]-5-([(Z)-3-heptenoyl]oxy)pyridine,
(—)-2-[4-(3-acetoxy-1-butyl)-4'-biphenyl]-5-([(Z)-3-octenoyl]oxy)pyridine.

EXAMPLE 6

1.0 g of 2-[4-(5-[propyloxy]-1-pentyl)phenyl]-5-hydroxypyridine, 0.42 g of (Z)-3-octen-1-ol, 0.58 g of diethyl azodicarboxylate, 0.88 g of triphenylphosphine and 100 ml of tetrahydrofuran are reacted in an analogous manner to Example 3 to give 0.8 g of 2-[4-(5-[propyloxy]-1-pentyl)phenyl]-5-([(Z)-3-octenyl]oxy)-pyridine.

The following compounds can be manufactured in an analogous manner:
2-[4-(5-[Propyloxy]-1-pentyl)phenyl]-5-([(E)-2-octenyl]oxy)pyridine,
2-[4-(5-[propyloxy]-1-pentyl)phenyl]-5-([(E)-2-nonenyl]oxy)pyridine,
2-[4-(5-[propyloxy]-1-pentyl)phenyl]-5-([(E)-2-decenyl]oxy)pyridine,
2-[4-(5-[propyloxy]-1-pentyl)phenyl]-5-([(E)-2-undecenyl]oxy)pyridine,
2-[4-(5-[propyloxy]-1-pentyl)phenyl]-5-([(E)-2-dodecenyl]oxy)pyridine,
2-[4-(5-[propyloxy]-1-pentyl)phenyl]-5-([(Z)-3-nonenyl]oxy)pyridine,
2-[4-(5-[propyloxy]-1-pentyl)phenyl]-5-([(Z)-3-decenyl]oxy)pyridine,
2-[4-(5-[propyloxy]-1-pentyl)phenyl]-5-([(Z)-3-undecenyl]oxy)pyridine,
2-[4-(5-[propyloxy]-1-pentyl)phenyl]-5-([(Z)-3-dodecenyl]oxy)pyridine,
2-[4-(5-[propyloxy]-1-pentyl)phenyl]-5-([(E)-4-octenyl]oxy)pyridine,
2-[4-(5-[propyloxy]-1-pentyl)phenyl]-5-([(E)-4-nonenyl]oxy)pyridine,
2-[4-(5-[propyloxy]-1-pentyl)phenyl]-5-([(E)-4-decenyl]oxy)pyridine,
2-[4-(5-[propyloxy]-1-pentyl)phenyl]-5-([(E)-4-undecenyl]oxy)pyridine,
2-[4-(5-[propyloxy]-1-pentyl)phenyl]-5-([(E)-4-dodecenyl]oxy)pyridine,
2-[4-(5-[propyloxy]-1-pentyl)phenyl]-5-([(Z)-5-octenyl]oxy)pyridine,
2-[4-(5-[propyloxy]-1-pentyl)phenyl]-5-([(Z)-5-nonenyl]oxy)pyridine,
2-[4-(5-[propyloxy]-1-pentyl)phenyl]-5-([(Z)-5-decenyl]oxy)pyridine,
2-[4-(5-[propyloxy]-1-pentyl)phenyl]-5-([(Z)-5-undecenyl]oxy)pyridine,
2-[4-(5-[propyloxy]-1-pentyl)phenyl]-5-([(Z)-5-dodecenyl]oxy)pyridine,
2-[4-(5-[propyloxy]-1-pentyl)phenyl]-5-([(E)-6-octenyl]oxy]pyridine,
2-[4-(5-[propyloxy]-1-pentyl)phenyl]-5-([(E)-6-nonenyl]oxy]pyridine,
2-[4-(5-[propyloxy]-1-pentyl)phenyl]-5-([(E)-6-decenyl]oxy]pyridine,
2-[4-(5-[propyloxy]-1-pentyl)phenyl]-5-([(E)-6-undecenyl]oxy]pyridine,
2-[4-(5-[propyloxy]-1-pentyl)phenyl]-5-([(E)-6-dodecenyl]oxy]pyridine,
2-[4-(5-[propyloxy]-1-pentyl)phenyl]-5-([7-octenyl]oxy]pyridine,
2-[4-(5-[propyloxy]-1-pentyl)phenyl]-5-([8-nonenyl]oxy]pyridine,
2-[4-(5-[propyloxy]-1-pentyl)phenyl]-5-([9-decenyl]oxy]pyridine,
2-[4-(5-[propyloxy]-1-pentyl)phenyl]-5-([10-undecenyl]oxy]pyridine, 2-[4-(5-[propyloxy]-1-pentyl)phenyl]-5-([11-dodecenyl]oxy)pyridine,
2-[4-(5-[methoxy]-1-pentyl)-4'-biphenyl]-5-([(E)-2-pentenyl]oxy)pyridine,
2-[4-(5-[methoxy]-1-pentyl)-4'-biphenyl]-5-([(E)-2-hexenyl]oxy)pyridine,
2-[4-(5-[methoxy]-1-pentyl)-4'-biphenyl]-5-([(E)-2-heptenyl]oxy)pyridine,
2-[4-(5-[methoxy]-1-pentyl)-4'-biphenyl]-5-([(E)-2-octenyl]oxy)pyridine.
2-[4-(5-[methoxy]-1-pentyl)-4'-biphenyl]-5-([(Z)-3-pentenyl]oxy)pyridine,
2-[4-(5-[methoxy]-1-pentyl)-4'-biphenyl]-5-([(Z)-3-hexenyl]oxy)pyridine,
2-[4-(5-[methoxy]-1-pentyl)-4'-biphenyl]-5-([(Z)-3-heptenyl]oxy)pyridine,
2-[4-(5-[methoxy]-1-pentyl)-4'-biphenyl]-5-([(Z)-3-octenyl]oxy)pyridine.

We claim:

1. A compound of the formula

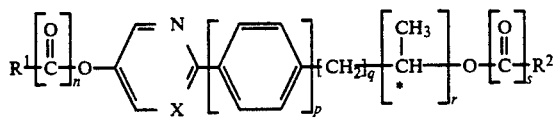

wherein
$R^1$ is $C_{5-12}$-alkyl or $C_{5-12}$-alkenyl;
$R^2$ is $C_{1-9}$-alkyl or $C_{2-9}$-alkenyl; provided that at least one of groups $R^1$ and $R^2$ is alkenyl;
X is a CH group or nitrogen;
n is either 0 or 1;
q is a whole number between 2 and 6 inclusive;
r is either 0 or 1 provided that the sum of q and r is at least 3,
s is either 0 or 1;
p is either 1 or 2, provided that n is zero when p is 2.

2. The compound according to claim 1 of the formula

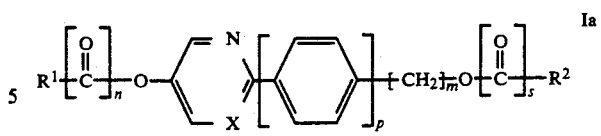

wherein m is a whole number between 3 to 6, inclusive.

3. A compound according to claim 1, wherein $R^1$ is $C_{5-10}$-alkenyl; $R^2$ is $C_{1-7}$-alkyl; and X is nitrogen.

4. A compound according to claim 1 of the formula

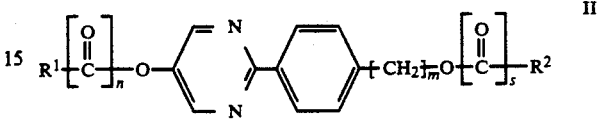

wherein
$R^1$ is $C_{8-10}$-alkenyl;
$R^2$ is $C_{1-5}$-alkyl; and
m is a whole number between 3 to 6, inclusive.

5. A liquid crystalline mixture comprising at least two components, wherein at least one component is a compound of the formula

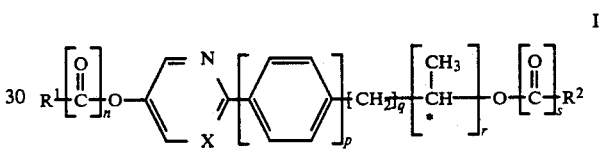

wherein
$R^1$ is $C_{5-12}$-alkyl or $C_{5-12}$-alkenyl;
$R^2$ is $C_{1-9}$-alkyl or $C_{2-9}$-alkenyl; provided that at least one of groups $R^1$ and $R^2$ is alkenyl;
X is a CH group or nitrogen;
n is either 0 or 1;
q is a whole number between of 2 to 6 inclusive;
r is either 0 or 1 provided that the sum of q and r is at least 3,
s is either 0 or 1; and
p is either 1 or 2, provided that n is zero when p is 2.

* * * * *